United States Patent
Engel et al.

[15] 3,655,929
[45] Apr. 11, 1972

[54] DEVICE FOR DETECTING AND SIGNALLING A CHANGE OF MORE THAN A PRESCRIBED AMOUNT IN THE RATE OF MOVEMENT OF AN OBJECT

[72] Inventors: Elton D. Engel, Livonia; Richard H. Miller, Wayne, both of Mich.

[73] Assignee: Ford Motor Company, Dearborn, Mich.

[22] Filed: Oct. 23, 1970

[21] Appl. No.: 83,550

[52] U.S. Cl. ................................200/61.45 R, 280/150 AB
[51] Int. Cl. ........................................................H01h 35/14
[58] Field of Search ................................200/61.45–61.53; 340/261, 262; 280/150 AB

[56] References Cited

UNITED STATES PATENTS

| | | | |
|---|---|---|---|
| 3,380,046 | 4/1968 | Paonessa | 340/262 |
| 3,492,450 | 1/1970 | Stockdale et al. | 200/61.45 |
| 2,881,276 | 4/1959 | Mintz et al. | 200/61.45 |

Primary Examiner—Robert K. Schaefer
Assistant Examiner—M. Ginsburg
Attorney—John R. Faulkner and William E. Johnson

[57] ABSTRACT

The device detects and signals a change of more than a prescribed amount in the rate of movement of an object. The major elements forming the device include the following. A housing is secured to the object. This housing encloses a movable element. Contacts are, in part, associated with the interior surface of the housing and, in part, associated with the movable element for completing a circuit therethrough when closed. Resilient elements are employed for acting between the interior of the housing and the movable element. The resilient elements normally separate the contacts of the housing and the movable element so that no circuit is completed. The resilient devices are yieldable during the time when the object has its rate of movement changed to permit relative movement of the housing and the movable element so that the contacts move generally toward a closed position. A circuit is also provided for signalling that the device has detected a change of more than a prescribed amount in the rate of movement of the object. This signal occurs when the contact associated with the housing and the contact associated with the movable element are closed.

5 Claims, 2 Drawing Figures

Patented April 11, 1972
3,655,929
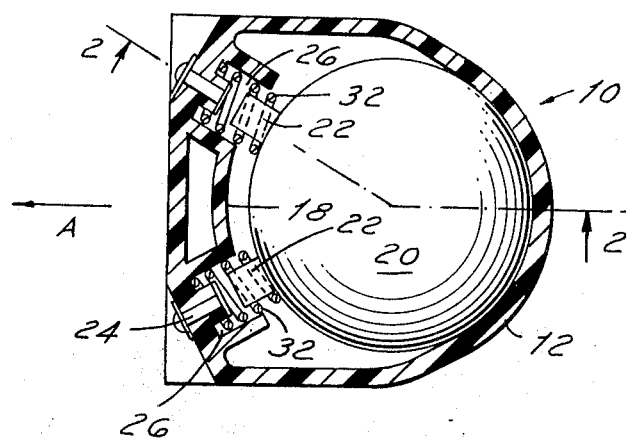
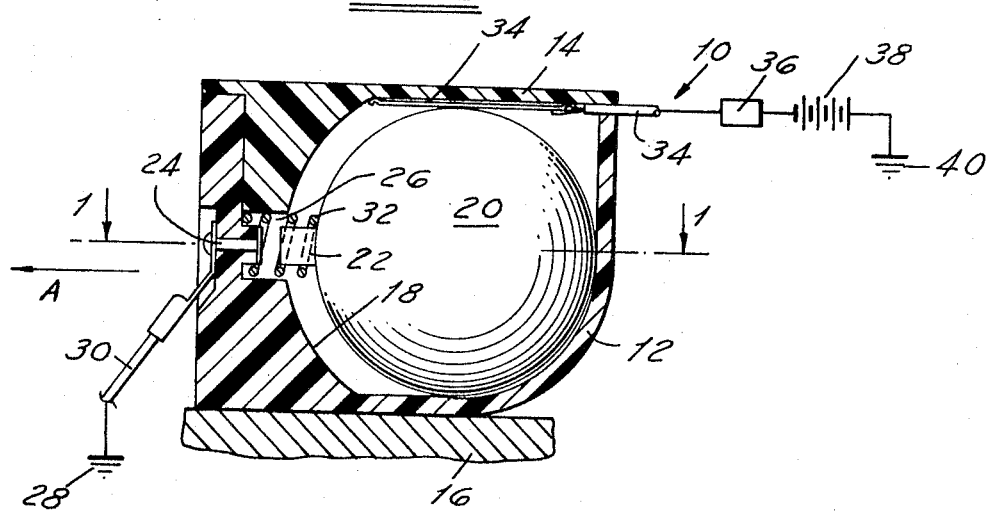
INVENTORS
Elton D. Engel
Richard H. Miller
BY John R. Faulkner
William E. Johnson
ATTORNEYS

DEVICE FOR DETECTING AND SIGNALLING A CHANGE OF MORE THAN A PRESCRIBED AMOUNT IN THE RATE OF MOVEMENT OF AN OBJECT

BACKGROUND OF THE INVENTION

The use of inflatable air bag restraint systems has been proposed for protection of occupants of a vehicle when the vehicle is involved in a crash. Such restraint systems generally include inflatable air bags stored in a position adjacent the occupant seated within the vehicle. A gas supply for inflating the bag is also provided as well as a control device which permits inflation of the bag by the gas supply when a crash detecting and signalling device triggers the control device.

The crash detecting and signalling device used with these restraint systems must be of a type which detects a change in the rate of movement of the vehicle. The device also must be able to discriminate between any normal changes in the rate of movement which occur during operation of the vehicle and the substantially larger changes in the rates of movement which occur during a crash of the vehicle. Thus, any device for detecting and signalling that a crash of the vehicle is going to occur must have the following attributes. It must be reliable over the years of operation of the vehicle. It must be economical to construct. It must be sensitive to changes in vehicle rates so that the device is able to discriminate between normal changes in the vehicle rates and excessive changes in vehicle rates which indicate the occurrence of a crash. The device must be effective in operation when a crash of the vehicle occurs in a direction other than the normal direction of movement of the vehicle as when the vehicle is impacted at an angle to the front thereof.

The detecting and signalling device of this invention has been designed so that it is: reliable over its operational life, economical to construct, efficient in operation, capable of discriminating between normal changes in the rate of movement of the vehicle and changes of the rate of movement of excessive amounts, and operational to detect crashes in many directions.

SUMMARY OF THE INVENTION

This invention relates to a detecting and signalling device and, more particularly, to a device for detecting and signalling a change of more than a prescribed amount in the rate of movement of an object such as a vehicle.

In accordance with the general teachings of this invention, a device for detecting and signalling a change of more than a prescribed amount in the rate of movement of an object includes at least the following elements. A housing, secured to the object, has an interior sufficiently large to accommodate therewithin a movable element. Contacts are, in part, associated with the interior surface of the housing and, in part, with the movable element so that a circuit may be completed through the contacts when closed. Resilient elements act between the interior of the housing and the movable element for normally separating these two so that no circuit is completed through the contacts. The resilient elements are yieldable during the time when the object has its rate of movement changed. The yielding of the resilient elements permits the relative movement of the housing and the movable element so that the contacts carried on the two are moved toward the closed position. The contacts are moved to the closed position when the rate of change of movement of the object is excessive. A circuit is provided through the closed contacts to signal that the device has, in fact, detected a change of more than a prescribed amount in the rate of movement of the object. The signal, so derived, is employed to trigger the gas supply of the air bag restraint system so that the inflatable air bag of the system is deployed in front of an occupant of the vehicle.

In greater detail, the movable element is a sphere contained within the interior of the housing. The contacts associated with the sphere are a pair of nibs formed at angularly spaced positions on the surface of the sphere. The contacts associated with the interior surface of the housing are contained within a pair of openings, each of which openings partially encircle one of the nibs. The contacts on the interior of the housing are positioned at the rear portion of the openings and are contacted to close the circuit when the sphere has been displaced within the interior of the housing a sufficient amount. The resilient devices employed to separate the movable sphere and the interior surface of the housing are a pair of springs with a selected spring force. One spring is associated with each of the openings formed in the interior surface of the housing. Each spring extends from its opening to a position encircling one of the nibs of the sphere.

BRIEF DESCRIPTION OF THE DRAWINGS

FIG. 1 is a plan view, in cross section, taken along line 1—1 of FIG. 2 showing in detail the detecting and signalling device of this invention.

FIG. 2 is an elevational view, in cross section, taken along line 2—2 of FIG. 1 showing the detecting and signalling device of this invention in greater detail.

GENERAL DESCRIPTION OF THE PREFERRED EMBODIMENT CONSTRUCTION

The detecting and signalling device of this invention is shown in FIGS. 1 and 2 and generally identified therein by the numeral 10. The device may be used for signalling a change of more than a prescribed amount in the rate of movement of an object such as a vehicle and, more particularly, the device may be utilized to provide a positive sensor response during a front end impact of the vehicle. The signalling of the front end impact or impending crash causes activation of the gas supply of an air bag restraint system which, in turn, inflates the air bag of the system in front of an occupant of the vehicle.

The detecting and sensing device 10 has a major element, a housing formed of a body 12 and a cover 14 (FIG. 2 only). The body and cover may be formed from a non-conductive material such as plastic in a molding operation. The housing is attached as shown in FIG. 2 to a support structure such as a body member 16 of a vehicle for movement with the vehicle. In general, the movement of the vehicle and its body member is in the principal direction indicated by arrow A of the Figures. In the case of a vehicle, this direction of movement would be towards the front of the vehicle and would be the direction in which the vehicle is normally operated.

The body 12 of the device 10 has a circular cross section as is best seen in FIG. 1. A portion of the interior surface of the body defines a principal surface 18. This principal surface faces the interior of the body in a direction generally opposed to the direction of principal movement of the vehicle as indicated by arrow A.

A metal sphere 20, formed from a conductive metal such as brass, is positioned within the interior of the body 12 of the device 10. The sphere is movable within the housing or body as is well understood by those skilled in the art in response to changes in the rate of movement of the body member 16.

A first pair of contacts in the form of a pair of nibs 22 are formed on the sphere 20. As best seen in FIG. 1, the nibs are spaced from one another by an angle of approximately 60° of arc. As best seen in FIG. 2, the nibs are located at the midpoint of the sphere 20 between the cover and the bottom of the interior wall of the body 12.

A second pair of contact elements 24 are provided on the body 12 of the device. Each of the second pair of contact elements 24 is contained within an associated opening 26. Each of the openings is defined, in part, by the body 12 and, in part, by the cover 14. The lower portion of each of the openings 26 and the principal surface 18 is defined by the body 12. The upper portion of each of the openings 26 is defined by the cover 14. Each of the contact elements 24 is connected to ground 28 by a lead 30 as is shown in FIG. 2.

A pair of springs, each designated by the numeral 32, are provided for association with the contacts 22 and 24. The spring force of these springs is selected in a manner known in the art to obtain the proper operating characteristics from the device 10. As best seen in the drawings, one end of each of the springs 32 is received about a projecting portion of the second contact element 24 within the opening 26. The other end of the spring 32 is received about an associated one of the nibs 22 defining the first contact elements. The action of the two springs 32 normally positions the metal sphere 20 within the interior of the body 12 as shown in the drawings. However, during the time when changes in the rate of movement of the vehicle are reflected in changes in the rate of movement of the body member 16, the sphere 20 is displaced against the spring force of the springs towards the principal surface 18 of the body 12 whereby one or the other of the two separate sets of contact elements move toward a closed position.

As seen only in FIG. 2, a lead wire 34 extends between the cover 14 and the body 12 of the device 10 to make electrical contact with the metal sphere 20. The lead 34 is, in turn, connected to a triggering device 36 for triggering the activation of an air bag restraint system (not shown). The triggering device is, in turn, connected to a source of electrical energy 38 and ground 40.

OPERATION

The detecting and sensing device 10 of this invention operates in the following manner. The device is secured to the body member 16 of a vehicle. When the vehicle is driven at a constant rate, the sphere 20 is positioned in its normal position within the interior of the body 12 of the housing of the device. When the vehicle experiences a change in the rate of speed, such as when the vehicle slows down for a stop light or other obstruction, the sphere 20 is displaced from its normal position against the spring force of the springs 32 generally in the direction of the principal surface 18 of the interior of the body 12. This type of displacement of the sphere, however, is not sufficient during these normal changes in speeds so that one or the other of the associated pair of contact elements comes into engagement to complete the circuit through the triggering device 36 for the air bag restraint system.

During the time when a substantial change of the rate of movement of the vehicle occurs, as for example, when the vehicle is involved in a crash, the sphere 20 is displaced from its normal position against the spring force of the springs by a substantial amount. The substantial displacement of the sphere brings one or the other of the associated pair of contacts 22 and 24 into engagement. The closing of one or the other of the associated pair of contacts completes the circuit from ground 40, through the battery 38, the triggering device 36, the lead 34, the metal sphere 20, one of the nibs 22 defining one of the first contacts, one of the second contacts 24, the lead 30 and ground 28 whereby the triggering device actuates the air bag restraint system. Of course movement of the sphere 20 within the interior of the housing 12 occurs against the biasing pressure of the springs 32. The springs 32 will return the sphere 20 to its normal condition after the time when the rate of change has occurred.

The invention disclosed will have many modifications which will be apparent to those skilled in the art in view of the teachings of this specification. It is intended that all modifications which fall within the true spirit and scope of this invention be included within the scope of the appended claims.

We claim:
1. A device for detecting and signalling a change of more than a prescribed amount in the rate of movement of an object, which device comprises:
a housing formed of nonconductive material secured to the object, said housing having an interior portion for movably confining a sphere, said interior portion of said housing also having a principal surface which faces inwardly generally in a direction opposite to that in which said object is principally moved, said principal surface of said housing having a pair of openings therein angularly spaced form one another and located midway between the top and the bottom of said interior of said housing;
a metal sphere enclosed within said interior portion of said housing for movement therewithin in directions generally toward and away from said principal surface;
a pair of first contact elements on said sphere, said elements being formed integrally with said sphere and being a pair of nibs which project outwardly from the surface of said sphere, said nibs being angularly spaced from one another and being located midway between the top and the bottom of said sphere, each of said nibs of said sphere being aligned with and encircled by an associated one of said openings of said principal surface of said housing;
a pair of second contact elements mounted one each within an associated one of said pair of openings in said principal surface of said housing, said contact elements being spaced from said nibs of said sphere when said sphere is in a normal position;
individual spring means for acting between each of said opposed sets of contact elements, said spring means normally spacing said sets of contact elements so that no circuit is completed therethrough, said spring means being yieldable to permit relative movement of said sphere and said housing when the object has its rate of movement in its principal direction changed so that at least one set of said contact elements is moved toward a closed position; and
circuit means for completing a circuit through said set of contact elements when closed thereby to signal that the device has detected a change of more than a prescribed amount in the rate of movement of the object.

2. The device of Claim 1 wherein: said individual spring means are a pair of coil springs, one end of each of said springs being received in an associated one of said openings of said principal surface of said housing and the other end of each of said springs being received about an associated one of said nibs of said sphere.

3. The device of Claim 2 wherein: the non-conductive housing is formed as a two-piece structure having a body portion and a cover portion, said body portion defining both the lower half of said principal surface and the lower half of said openings of said housing while said cover portion defines the upper half of both said principal surface and the upper portion of said openings of said housing.

4. The device of Claim 3 wherein: said circuit means includes a lead wire passing between said body portion and said cover portion of said housing, said lead wire being connected to said metal sphere within the interior of said housing.

5. The device of Claim 4 wherein: the axis of said nibs of said sphere are separated angularly by 60° of arc.

* * * * *